(12) United States Patent
Hoshino et al.

(10) Patent No.: US 10,458,358 B2
(45) Date of Patent: Oct. 29, 2019

(54) FUEL MICROINJECTION VOLUME CORRECTION METHOD AND COMMON-RAIL FUEL INJECTION CONTROL DEVICE

(71) Applicant: Bosch Corporation, Tokyo (JP)

(72) Inventors: Atsushi Hoshino, Saitama (JP); Shouta Tashiro, Saitama (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 16/082,735

(22) PCT Filed: Feb. 9, 2017

(86) PCT No.: PCT/JP2017/004655
§ 371 (c)(1),
(2) Date: Sep. 6, 2018

(87) PCT Pub. No.: WO2017/154451
PCT Pub. Date: Sep. 14, 2017

(65) Prior Publication Data
US 2019/0093587 A1 Mar. 28, 2019

(30) Foreign Application Priority Data
Mar. 8, 2016 (JP) .................. 2016-044869

(51) Int. Cl.
*F02D 41/24* (2006.01)
*F02D 41/04* (2006.01)
(Continued)

(52) U.S. Cl.
CPC ....... *F02D 41/247* (2013.01); *F02D 41/0225* (2013.01); *F02D 41/04* (2013.01);
(Continued)

(58) Field of Classification Search
CPC .... F02D 41/0225; F02D 41/247; F02D 41/04; F02D 41/3809; B60W 10/06; B60W 10/10
See application file for complete search history.

(56) References Cited

U.S. PATENT DOCUMENTS

| | | | |
|---|---|---|---|
| 2002/0010539 A1* | 1/2002 | Machida | F02D 31/007 701/104 |
| 2008/0216465 A1* | 9/2008 | Ando | F02D 41/0255 60/284 |
| 2011/0266760 A1* | 11/2011 | Itabashi | B60L 15/2054 280/5.507 |

FOREIGN PATENT DOCUMENTS

| | | |
|---|---|---|
| JP | 2007224925 | 9/2007 |
| JP | 2011256839 | 12/2011 |
| JP | 2013015076 | 1/2013 |

OTHER PUBLICATIONS

International Search Report for Application No. PCT/JP2017/004655 dated Apr. 11, 2017 (English Translation, 1 page).

\* cited by examiner

*Primary Examiner* — Edwin A Young
(74) *Attorney, Agent, or Firm* — Michael Best & Friedrich LLP

(57) ABSTRACT

The invention realizes fuel microinjection volume correction with high degrees of accuracy, stability, and reliability regardless of a configuration of a transmission. In fuel microinjection volume correction control in which microinjection is performed as fuel injection in a microinjection volume and in which deviations in a fuel injection volume resulting from deviations in an injection characteristic of a fuel injection valve are corrected on the basis of a difference between a reference energizing time and an energizing time for the microinjection that is acquired on the basis of a fluctuation amount of an engine speed generated at the time, (Continued)

when the energizing time for the microinjection is acquired on the basis of the fluctuation amount of the engine speed, the fluctuation amount of the engine speed is corrected on the basis of a gear ratio and the engine speed so as to eliminate an unnecessary change that occurs to the fluctuation amount of the engine speed due to a gear shift operation of the transmission. In this way, the accuracy of the fuel microinjection volume correction can be improved.

2 Claims, 3 Drawing Sheets

(51) Int. Cl.
  *F02D 41/02* (2006.01)
  *F02D 41/38* (2006.01)
  *F02D 41/40* (2006.01)
  *F02M 61/04* (2006.01)
(52) U.S. Cl.
  CPC ....... *F02D 41/3809* (2013.01); *F02D 41/403* (2013.01); *F02M 61/04* (2013.01)

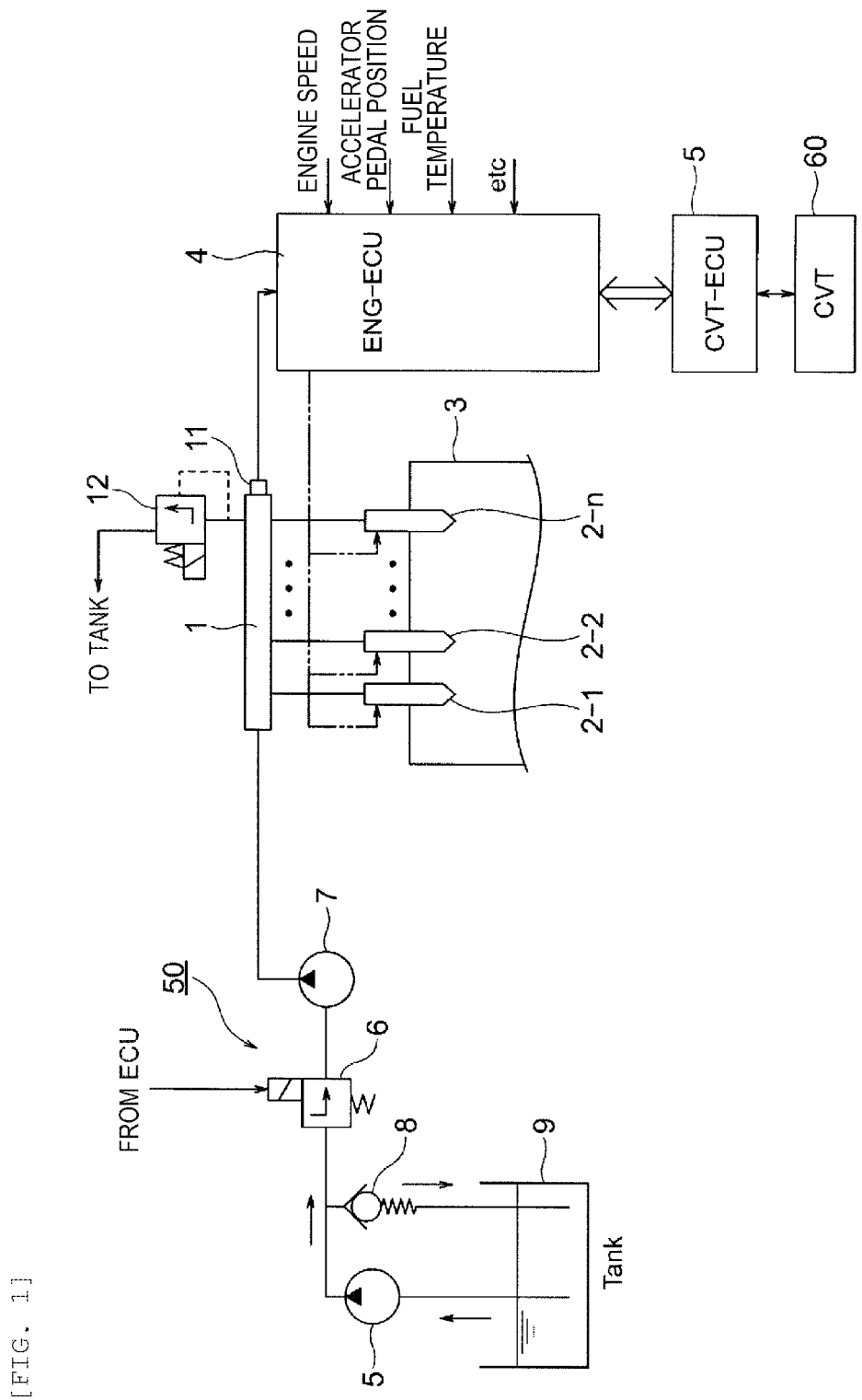
[FIG. 1]

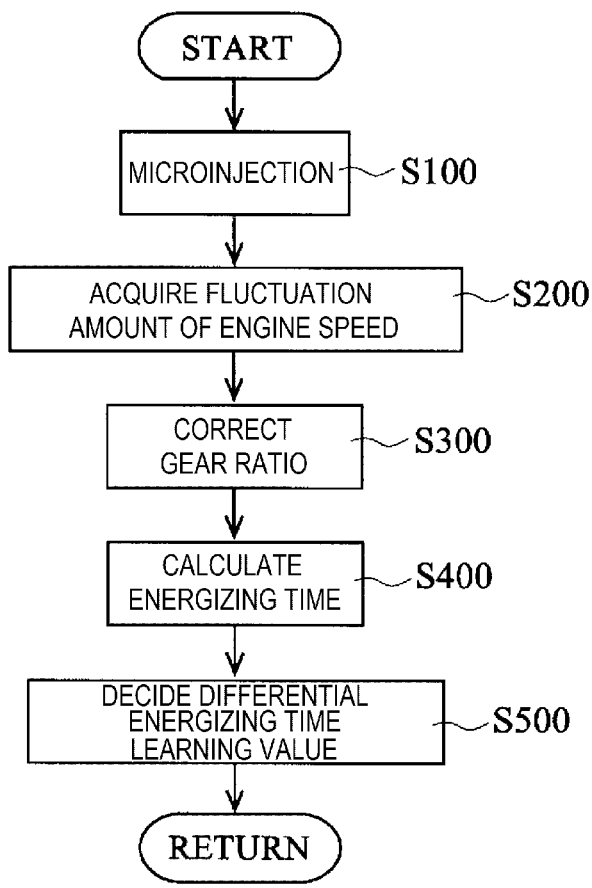

[FIG. 3]
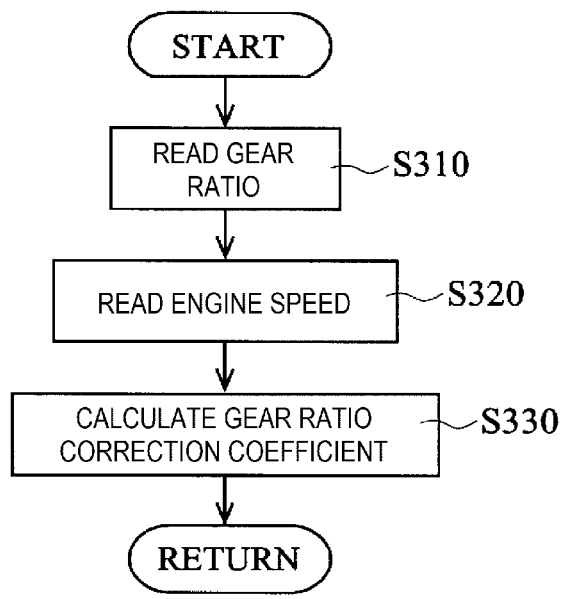

FUEL MICROINJECTION VOLUME CORRECTION METHOD AND COMMON-RAIL FUEL INJECTION CONTROL DEVICE

BACKGROUND OF THE INVENTION

The invention relates to fuel injection volume correction control for an internal combustion engine and, in particular, relates to improvement in reliability and stability of correction in fuel microinjection volume correction control, and the like.

How to execute fuel injection control in an internal combustion engine is an essential matter as it significantly influences operation performance of the internal combustion engine. As it has been well known, various control methods therefor have conventionally been proposed and in practical use.

For example, there is a well-known technique of performing pilot injection at multiple stages in a diesel engine in order to achieve moderate combustion for reduced engine vibrations during combustion, improve fuel consumption, and reduce pollutants in exhaust gas.

In order to sufficiently and reliably exert effects of such pilot injection as described above, it is necessary to accurately control a microinjection volume therefor. However, injection characteristics vary by fuel injection valves due to manufacturing tolerances, deterioration by aging, and the like, and thus a deviation of an actual injection volume from an instructed injection volume is inevitable.

In order to eliminate the deviation in the fuel injection volume, just as described, it is common to execute correction control of the injection volume in pilot injection control.

As a known technique of correcting such a pilot injection volume, for example, in a state where an accelerator pedal is not depressed, microinjection is performed when a vehicle is in a non-injection state, a fluctuation amount of an engine speed at the time is detected, the fuel injection volume that is considered to be actually injected by the fuel injection valve is calculated on the basis of the detected fluctuation amount of the engine speed, and the fuel injection volume is corrected using a difference between the calculation result and the instructed injection volume as a correction volume of the fuel injection volume for the pilot injection (for example, see JP-A-2011-256839 and the like).

In the above-described fuel injection volume correction method, the fluctuation amount of the engine speed that is acquired by the microinjection is extracted on the basis of a rotation signal acquired by a sensor that detects rotation of a crankshaft of the engine. Thus, as long as the microinjection volume is the same, the fluctuation amount of the engine speed normally remains constant regardless of a gear shift operation of a transmission. However, in reality, it has been known that the fluctuation amount of the engine speed changes in accordance with a gear stage and the engine speed during travel.

For this reason, a method of eliminating an influence of the transmission as described above by calculating a correction coefficient that corresponds to the gear stage and the engine speed by using a map that is defined in advance on the basis of a test or the like and correcting the fluctuation amount of the engine speed resulting from the operation of the transmission by the correction coefficient has conventionally been adopted.

In recent years, in order to handle requests of diversified vehicle models and the like, for example, a diesel vehicle on which a mechanical transmission has conventionally and frequently been mounted is configured by including a continuously variable transmission, and such a vehicle with the configuration and the like have been commercialized.

In the case where the above fuel injection volume correction control is applied to such a vehicle using the continuously variable transmission, instead of the gear stage, which has conventionally been used, a gear ratio is used for the fuel injection volume correction control by a control device that executes operation control of the continuously variable transmission (hereinafter referred to as a "continuously variable transmission control device" for convenience of the description).

Thus, it is necessary to convert the input gear ratio to the gear stage that corresponds to the gear ratio and retrieve the correction coefficient from the above map.

SUMMARY OF THE INVENTION

However, while a value of the gear ratio used by the continuously variable transmission control device continuously changes, the gear ratio that corresponds to the gear stage in the map for the retrieval of the correction coefficient is discrete. Thus, the gear stages that comprehensively cover all of the gear ratios received from the continuously variable transmission control device are unavailable, and a certain measure has to be taken therefor.

For example, as one example of the measure, it is considered to adopt a method of converting the gear ratio to a value of the closest gear ratio of the selectable gear ratios in the case where the gear ratio that corresponds to the gear stage is unavailable, or to temporarily stop the fuel injection volume correction control in the case where the corresponding gear ratio is unavailable. However, this results in deterioration in accuracy and deterioration in reliability of the fuel injection volume correction control.

The invention has been made in view of the above circumstances and therefore provides a fuel injection volume correction method and a common-rail fuel injection control device with high degrees of accuracy, stability, and reliability regardless of a configuration of a transmission.

In order to achieve the above purpose of the invention, a fuel microinjection volume correction method according to the invention is a fuel microinjection volume correction method in a common-rail fuel injection control device configured to be able to correct deviations in a fuel injection volume resulting from deviations in an injection characteristic of a fuel injection valve by performing microinjection as fuel injection in a microinjection volume, acquiring an energizing time for the microinjection on the basis of a fluctuation amount of an engine speed generated at the time, and storing a difference from a reference energizing time that is acquired in advance for the fuel injection valve as a learning value in an updatable manner in a non-injection state of the fuel injection valve, so as to thereafter set a value that is acquired by correcting the reference energizing time by the learning value as the energizing time at the time of the microinjection.

The fuel microinjection volume correction method is configured to correct the fluctuation amount of the engine speed on the basis of a gear ratio and the engine speed so as to eliminate an unnecessary change that occurs to the fluctuation amount of the engine speed due to a gear shift operation of a transmission when acquiring the energizing time for the microinjection on the basis of the fluctuation amount of the engine speed.

In addition, in order to achieve the above purpose of the invention, a common-rail fuel injection control device according to the invention is a common-rail fuel injection control device that is equipped with an electronic control unit configured to be able to correct deviations in a fuel injection volume resulting from deviations in an injection characteristic of a fuel injection valve by performing microinjection as fuel injection in a microinjection volume, acquiring an energizing time for the microinjection on the basis of a fluctuation amount of an engine speed generated at the time, and storing a difference from a reference energizing time that is acquired in advance for the fuel injection valve as a learning value in an updatable manner in a non-injection state of the fuel injection valve, so as to thereafter set a value that is acquired by correcting the reference energizing time by the learning value as the energizing time at the time of the microinjection.

The electronic control unit is configured to correct the fluctuation amount of the engine speed on the basis of a gear ratio and the engine speed so as to eliminate an unnecessary change that occurs to the fluctuation amount of the engine speed due to a gear shift operation of a transmission when acquiring the energizing time for the microinjection on the basis of the fluctuation amount of the engine speed.

According to the invention, the unnecessary change that appears to the fluctuation amount of the engine speed due to the gear shift operation of the transmission is eliminated by the correction, and the corrected fluctuation amount of the engine speed is used for the fuel injection amount correction control. Therefore, it is possible to exert an effect of realizing the fuel injection volume correction control with high degrees of accuracy, stability, and reliability regardless of a configuration of the transmission.

BRIEF DESCRIPTION OF THE DRAWINGS

FIG. 1 is a configuration diagram that illustrates a configuration example of a common-rail fuel injection control device to which a fuel microinjection volume correction method in an embodiment of the invention is applied.

FIG. 2 is a subroutine flowchart that illustrates a schematic procedure of entire fuel microinjection volume correction processing that is executed in the common-rail fuel injection control device in the embodiment of the invention.

FIG. 3 is a subroutine flowchart that illustrates a procedure of gear ratio correction coefficient calculation processing in the fuel microinjection volume correction processing that is executed in the common-rail fuel injection control device in the embodiment of the invention.

DETAILED DESCRIPTION

A description will hereinafter be made on an embodiment of the invention with reference to FIG. 1 to FIG. 3.

Note that members, arrangement, and the like, which will be described below, do not limit the invention and various modifications can be made thereto within the scope of the spirit of the invention.

First, a description will be made on a configuration example of a common-rail fuel injection control device to which a fuel microinjection volume correction method in the embodiment of the invention is applied with reference to FIG. 1.

This common-rail fuel injection control device is configured by including, as primary components: a high-pressure pump device 50 that pressure-feeds high-pressure fuel, a common rail 1 that accumulates the high-pressure fuel pressure-fed by this high-pressure pump device 50; plural fuel injection valves 2-1 to 2-*n*, each of which injects and supplies the high-pressure fuel supplied from this common rail 1 to a cylinder of an engine 3; and an engine control unit (described as "ENG-ECU" in FIG. 1) 4 that executes fuel injection control processing, rail pressure control processing, which will be described below, and the like.

Such a configuration itself is the same as a basic configuration of this type of the common-rail fuel injection control device that has conventionally been well known.

The high-pressure pump device 50 has a known/well-known configuration and is configured by including a supply pump 5, a metering valve 6, and a high-pressure pump 7 as primary components.

In such a configuration, fuel in a fuel tank 9 is pumped up by the supply pump 5 and is then supplied to the high-pressure pump 7 via the metering valve 6. An electromagnetic proportional control valve is used as the metering valve 6, and an energizing amount thereof is controlled by the engine control unit 4. In this way, a flow rate of the supply fuel to the high-pressure pump 7, in other words, a discharge volume of the high-pressure pump 7 is regulated.

Note that a return valve 8 is provided between an output side of the supply pump 5 and the fuel tank 9 and thus can return a surplus of the fuel on the output side of the supply pump 5 to the fuel tank 9.

In addition, the supply pump 5 may be provided as a separate component from the high-pressure pump device 50 on an upstream side of the high-pressure pump device 50 or may be provided in the fuel tank 9.

Each of the fuel injection valves 2-1 to 2-*n* is provided per cylinder of the engine 3 and injects the fuel thereinto through injection control by the engine control unit 4 when being supplied with the high-pressure fuel from the common rail 1.

The common rail 1 of the invention is provided with a pressure control valve 12 as an electromagnetic proportional control valve in a return passage (not illustrated) through which a surplus of the high-pressure fuel is returned to the tank 9, and, together with the metering valve 6, the pressure control valve 12 is used to control a rail pressure.

In the embodiment of the invention, operation states of the metering valve 6 and the pressure control valve 12 are appropriately changed in accordance with an operation state of the engine 3. In this way, appropriate rail pressure control is realized.

The engine control unit 4 has storage elements (not illustrated) such as RAM and ROM in a microcomputer (not illustrated) with a known/well-known configuration as a central component, for example, and is configured by including, as primary components: a drive circuit (not illustrated) for driving the fuel injection valves 2-1 to 2-*n*; and an energization circuit (not illustrated) for energizing the metering valve 6 and the pressure control valve 12.

Such an engine control unit 4 receives a detection signal of a pressure sensor 11 that detects a pressure of the common rail 1 and also receives various detection signals such as an engine speed, an accelerator pedal position, and a fuel temperature so as to be used for operation control of the engine 3 and the fuel injection control.

As a precondition, a continuously variable transmission (described as "CVT" in FIG. 1) 60 is mounted on a vehicle on which the common-rail fuel injection control device in the embodiment of the invention is mounted, and a gear shift control unit (described as "CVT-ECU" in FIG. 1) 5 is provided for operation control thereof.

Similar to the above engine control unit 4, this gear shift control unit 5 has storage elements (not illustrated) such as RAM and ROM in a microcomputer (not illustrated) with a known/well-known configuration as a central component, for example, and is configured by including, as primary components: an interface circuit (not illustrated) with the continuously variable transmission 60; and the like.

Such a gear shift control unit 5 executes the operation control of the continuously variable transmission 60 in accordance with a travel state of the vehicle, and a basic configuration, a basic operation, and the like thereof are not unique to the invention but are basically the same as those in the related art.

Note that the gear shift control unit 5 successively supplies information on a gear ratio in the continuously variable transmission 60 to the engine control unit 4 while executing the operation control of the continuously variable transmission 60.

As a precondition, in the common-rail fuel injection control device in the embodiment of the invention, in addition to the above-described basic configuration, the engine control unit 4 executes fuel microinjection volume correction control as will be described next.

The fuel microinjection volume correction control as the precondition of the embodiment of the invention is also executed in the conventional device and particularly corrects deviations in a fuel injection volume in pilot injection as microinjection from an original fuel injection volume, which result from deterioration, variations, or the like of the fuel injection valves 2-1 to 2-n.

An overview of an entire processing procedure of such fuel microinjection volume correction control will be described with reference to a subroutine flowchart illustrated in FIG. 2. First, in a state where an accelerator pedal is not depressed (the accelerator pedal position is zero) during travel of the vehicle, in the case where the fuel injection to the engine 3 by the fuel injection valves 2-1 to 2-n is in a non-injection state, a target microinjection volume that corresponds to the rail pressure is set, and the fuel injection in the target microinjection volume, that is, the microinjection is performed for several tens of times with one time of the microinjection per fuel injection cycle as a basis (see step S100 in FIG. 2).

Next, a fluctuation amount of the engine speed generated by the above-described microinjection is acquired (see step S200 in FIG. 2).

More specifically, as the fluctuation amount of the engine speed, an average value of a frequency component of the fluctuation amount of the engine speed is extracted as an angular velocity fluctuation amount. In addition, this fluctuation amount of the engine speed is extracted on the basis of rotation of a crankshaft that is detected by a rotation sensor or the like, for example.

Note that such processing is executed for each of the fuel injection valves 2-1 to 2-n.

The above-described several tens of times of the microinjection are performed for plural times while an energizing time is changed. In this way, the angular velocity fluctuation that corresponds to the fluctuation amount of the engine speed generated during the microinjection in the above target injection volume is extracted. Note that, in the case where the target injection volume is set as the injection volume in the pilot injection as the microinjection, that is, in the case where the target injection volume is a target pilot injection volume, the above-described angular velocity fluctuation is set as a reference angular velocity fluctuation.

Next, the gear ratio is corrected in a manner to correspond to the angular velocity fluctuation amount as the fluctuation amount of the engine speed acquired as described above (see step S300 in FIG. 2).

The angular velocity fluctuation amount that corresponds to the fluctuation amount of the engine speed acquired in above step S200 is extracted on the basis of the rotation of the crankshaft. Thus, as long as the microinjection volume is the same, the angular velocity fluctuation amount normally acquires a substantially constant value regardless of a gear shift operation of the transmission. However, in reality, an unnecessary change occurs to the angular velocity fluctuation amount in accordance with a gear stage and the engine speed during the travel.

The gear ratio correction is correction that is performed to eliminate the unnecessary change in the fluctuation amount of the engine speed resulting from the gear shift operation of the transmission as described above and to set the fluctuation amount of the engine speed back to the original value.

That is, in the gear ratio correction, the angular velocity fluctuation amount acquired in step S200 is corrected by using a gear ratio correction coefficient that is calculated as will be described below, and the angular velocity fluctuation amount, from which an influence of the continuously variable transmission 60 is eliminated, is acquired.

Next, the energizing time that corresponds to the corrected angular velocity fluctuation amount as described above is detected (see step S400 in FIG. 2).

In the case where the angular velocity fluctuation amount corresponds to the reference angular velocity fluctuation amount described above, a difference $\Delta ET$ between an energizing time ET thereof and a reference energizing time is stored as a differential energizing time learning value in an energizing time learning value map (see step S500 in FIG. 2).

Here, the reference energizing time is an energizing time at a time point at which each of the fuel injection valves 2-1 to 2-n starts being used. In other words, the reference energizing time is an energizing time that is actually measured immediately before each of the fuel injection valves 2-1 to 2-n starts being used. The energizing time that corresponds to the rail pressure and the fuel injection volume is mapped for each of the fuel injection valves 2-1 to 2-n and is stored in the electronic control unit 4 in advance.

When the fuel is injected in the fuel injection volume at the time of acquiring the differential energizing time learning value $\Delta ET$, a time for which the reference energizing time is corrected by the differential energizing time learning value $\Delta ET$ is used as the energizing time, and deviations in the fuel injection volume and the energizing time are corrected.

Next, a description will be made on a procedure of gear ratio correction coefficient calculation processing in the above-described gear ratio correction with reference to a subroutine flowchart illustrated in FIG. 3.

Once the processing by the engine control unit 4 is initiated, the gear ratio is first read (see step S310 in FIG. 3).

Here, the gear ratio is successively input from the gear shift control unit 5, is stored in an appropriate storage area of the engine control unit 4, and is updated every time new input is made. In step S310, the latest gear ratio is read from the above-described storage area into an area that is appropriately secured for execution of the gear ratio correction coefficient calculation processing.

Next, the engine speed is read (see step S320 in FIG. 3).

Here, the engine speed is acquired by the rotation sensor, which is not illustrated, and is received by the engine control unit 4. Similar to the above-described gear ratio, the engine speed is stored and updated in the appropriate storage area of the engine control unit 4. In step S320, the latest engine speed is read from the above-described storage area into the area that is appropriately secured for the execution of the gear ratio correction coefficient calculation processing.

Next, the gear ratio correction coefficient is calculated on the basis of the gear ratio and the engine speed (see step S330 in FIG. 3).

In the embodiment of the invention, in consideration of a specific specification and the like of the vehicle, the gear ratio correction coefficient is calculated by a gear ratio correction coefficient calculation equation using the above gear ratio and the above engine speed as input variables. The gear ratio correction coefficient calculation equation is set in advance on the basis of a test result or a simulation result.

Note that a specific method of correcting the angular velocity fluctuation amount by the gear ratio correction coefficient, which is calculated as described above, varies depending on how the gear ratio correction coefficient is defined. For example, a method of multiplying the gear ratio correction coefficient by the angular velocity fluctuation amount acquired in step S200, a method of dividing the angular velocity fluctuation amount by the gear ratio correction coefficient, or the like is possibly adopted. However, it is needless to say that the invention is not limited to any of these methods.

The invention can be applied to the common-rail fuel injection control device for which highly accurate microinjection volume correction under no influence of a structure of the transmission is desired.

The invention claimed is:

1. A fuel microinjection volume correction method in a common-rail fuel injection control device configured to correct deviations in a fuel injection volume resulting from deviations in an injection characteristic of a fuel injection valve and having a microcomputer that controls fuel injection, the fuel microinjection volume correction method comprising:
    performing, via the microcomputer, microinjection as fuel injection in a microinjection volume,
    acquiring, via the microcomputer, an energizing time for the microinjection on the basis of a fluctuation amount of an engine speed generated at the time,
    storing, via the microcomputer, a difference from a reference energizing time that is acquired in advance for the fuel injection valve as a learning value in an updatable manner in a non-injection state of the fuel injection valve,
    setting, via the microcomputer, a value that is acquired by correcting the reference energizing time by the learning value as the energizing time at the time of the microinjection, and
    correcting the fluctuation amount of the engine speed on the basis of a gear ratio and the engine speed so as to eliminate an unnecessary change that occurs to the fluctuation amount of the engine speed due to a gear shift operation of a transmission when acquiring the energizing time for the microinjection on the basis of the fluctuation amount of the engine speed.

2. A common-rail fuel injection control device, the device comprising:
    an electronic control unit including a microcomputer and configured to
    correct deviations in a fuel injection volume resulting from deviations in an injection characteristic of a fuel injection valve by controlling microinjection as fuel injection in a microinjection volume, acquiring an energizing time for the microinjection on the basis of a fluctuation amount of an engine speed generated at the time, and storing a difference from a reference energizing time that is acquired in advance for the fuel injection valve as a learning value in an updatable manner in a non-injection state of the fuel injection valve, so as to thereafter set a value that is acquired by correcting the reference energizing time by the learning value as the energizing time at the time of the microinjection, and
    correct the fluctuation amount of the engine speed on the basis of a gear ratio and the engine speed so as to eliminate an unnecessary change that occurs to the fluctuation amount of the engine speed due to a gear shift operation of a transmission when acquiring the energizing time for the microinjection on the basis of the fluctuation amount of the engine speed.

* * * * *